Nov. 30, 1943.                P. W. CRIST                2,335,390
                        CONTOUR EXPLORING INSTRUMENT
                            Filed Aug. 3, 1940

INVENTOR
PHILIP W. CRIST
BY Olew E. Bee
ATTORNEY.

Patented Nov. 30, 1943

2,335,390

UNITED STATES PATENT OFFICE 2,335,390

CONTOUR EXPLORING INSTRUMENT

Philip W. Crist, Pittsburgh, Pa., assignor to Pittsburgh Plate Glass Company, Allegheny County, Pa., a corporation of Pennsylvania Application August 3, 1940, Serial No. 350,945

1 Claim. (Cl. 73—51)

The present invention relates to instruments for exploring contours of surfaces and it has particular relation to an instrument suitable for detecting and exploring minute irregularities in relatively smooth or plane surfaces.

One object of the invention is to provide an instrument of the foregoing type which is relatively simple of structure and convenient to operate and which possesses a high degree of sensitivity.

This and other objects of the invention will be apparent from consideration of the following specification and the appended claim.

In such commercial operations as the grinding and polishing of glass the need frequently arises for a study of the smooth or partly smoothed surfaces for purposes of detecting and determining the nature of minute scratches or other irregularities therein. These irregularities are of such small size and such character and position as to render it difficult, if not impossible to examine them by ordinary apparatus.

In accordance with the provisions of the present invention the foregoing difficulties have been eliminated by provision of an exploratory instrument involving as one element an electrostatic capacitance or condenser mounted upon a support designed to carry one plate of the capacitance at a fixed distance from the surface to be explored and a second plate movably mounted with respect to the first plate and carrying an exploratory stylus adapted to rest upon the surface which is to be tested. In such instrument the spacing of the capacitance plates is governed by the stylus as it traverses the surface to be explored and by suitable instrumentalities, the fluctuations of the capacitance can be determined with a high degree of accuracy. By proper interpretation of the variations of the capacitance the irregularities of the surface can be detected and studied.

For a better understanding of the invention reference may now be had to the accompanying drawing in which Figure 1 illustrates diagrammatically a suitable embodiment of apparatus for use in practicing the invention.

In the drawing like numerals refer to like parts throughout.

Figure 3:
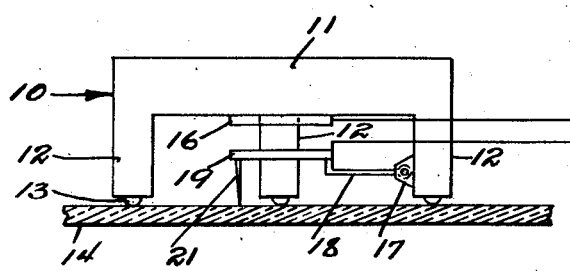
Figure 3 is an elevational view illustrating a simplified form of capacitance and a support therefor.

A main feature of the invention involves provision of a capacitance which includes a fixed plate carried by suitable support and a plate movably mounted with respect to the first plate and carrying an exploratory needle. Such device is illustrated in Figure 3. The apparatus comprises a tripod-like element 10 including a top portion 11 and legs 12, preferably 3 in number attached thereto. The bottom of the legs may be provided with ball or other form of feet 13 adapted to rest upon the surface of a sheet 14 of glass, or other material, the surface of which is to be examined. To the under side of the top 11 of the tripod is secured one plate 16 of a condenser or capacitance. One leg of the tripod may be provided with a bracket 17 to which is pivoted a lever 18 carrying the second plate 19 of the capacitance. A stylus-like point 21 is fixed upon the lower side of the latter plate in position to contact with the surface of a sheet 14.

Figure 1:
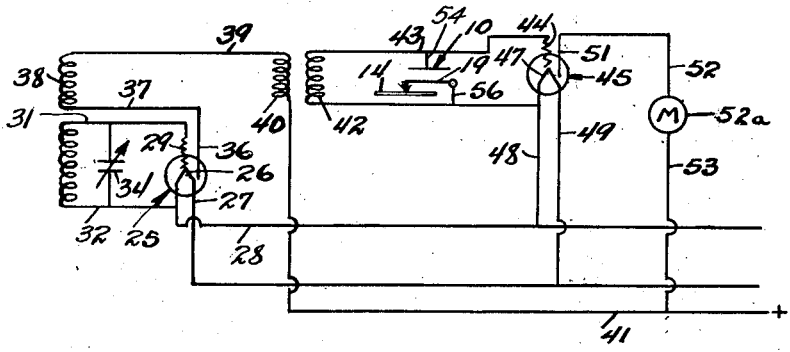

A suitable circuit for applying a high frequency voltage to the capacitance and for indicating variations in the latter as the instrument is moved over the surface to be explored may be housed in a case 15 and may take the form shown in Figure 1. This construction involves an oscillatory circuit including a three electrode, electronic tube 25 of a type similar to that commonly employed in a conventional radio circuit. This tube includes a heated filament 26 having connections 27 and 28 to a suitable source of current. Control grid 29 of the tube is connected to a coil 31 which at the other extremity is connected by lead 32 to conductor 28 in the filament circuit. A condenser 34, preferably of variable capacity is joined across the coil, in order to admit of tuning a circuit to any desired frequency.

Plate 36 of the tube is connected by lead 37 to a feed back coil 38 so disposed as to return a certain amount of energy of the circuit to the grid coil and thus generate continuous oscillation in the circuit. The coil 38 in turn is connected to lead 39 of the primary coil 40 of a loosely coupled transformer of the type employed in radio circuits. The coil at the opposite end joins to plate supply lead 41. The secondary coil 42 of the transformer is connected by lead 43 to control grid 44 of a second electronic tube or valve 45 similar to the first. The filament 47 of this valve is connected by leads 48 and 49 to current supply leads 27 and 28. The plate 51 of the tube is connected by lead 52 to a conventional voltmeter which in turn is connected by lead 53 to the plate voltage supply line 41.

The capacitance unit 10 is connected across coil 42 by leads 54 and 56, in such manner that the fluctuations in the capacity are reflected in the tuning of the circuit. Assuming that the tuning of the circuit of the electronic tube 45 is such that with plate 14 in a given position, resonance with the circuit of the oscillator tube 25 is obtained. Any change in the position of the plate, for example that produced by the needle 21 striking a pit or scratch, will produce variation in the capacity to throw the circuit off tune with respect to the oscillator. Therefore, there will be a reduction in the response of the circuit to the oscillations generated in the tube 25. This reduction is reflected in a change in the reading of the meter 52a.

In the operation of the apparatus the tripod may be simply set upon a sheet of glass with the stylus 21 in contact with the surface to be tested. By moving the tripod about over the surface, the stylus is made to follow the contours of the glass and in so doing produces the requisite reading of the instrument. By proper calibration of the instrument it is possible to determine from the readings the size and contours of irregularities.

Figure 2:
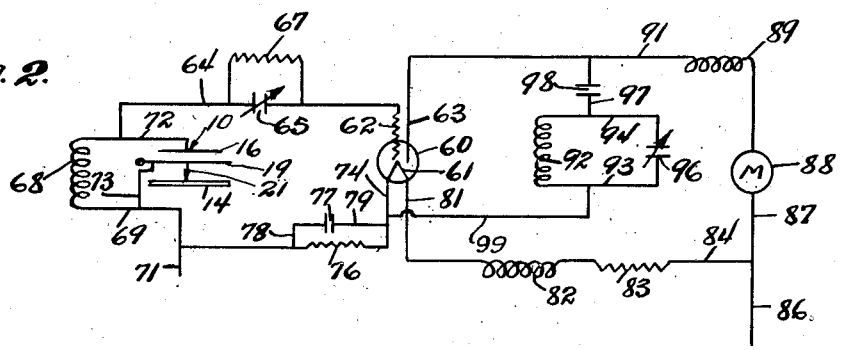
Figure 2 is a diagrammatic view of a modified form of circuit suitable for use in the application of the invention.

A slightly modified embodiment of the electrical circuit of the apparatus is shown in Figure 2. This circuit is designed particularly for operation from ordinary alternating current power lines. The circuit includes an electronic valve or tube 60 of the type employed in radio and similar work and including filament 61, control grid 62 and plate 63. The grid circuit of the apparatus includes a grid connection 64 having a grid condenser 65 and a parallelly connected grid leak 67. One extremity of the lead 64 is connected to one end of a grid coil 68 of the type employed in radio circuits, which coil at the opposite extremity is connected to a line 69 having further connection with power line 71. The unit 10 is connected across the grid coil 68 by a line 72 joining plate 16 to lead 64 and by a lead 73 joining movable plate 19 to lead 69.

Filament 61 is joined by lead 74 and a resistor 76 of suitable value to power line 71. The resistor may also be shunted by a capacitance 77 having suitable connections 78 and 79 upon opposite sides of the resistance.

Filament 61 is further joined by lead 81 to radio frequency choke coil 82, which is in series through the resistance element 83 and line 84 with a second power line 86. This line is connected by lead 87, milliammeter 88, radio frequency choke coil 89 and lead 91, to plate 63 of the tube.

Resonance of the plate circuit with the grid circuit of the tube 60 may be obtained by means of a circuit including a radio frequency coil 92 joined in parallel by leads 93 and 94 with a capacitance 96. Lead 94 is connected through lead 97 and blocking condenser 98 to the plate supply lead 91. Lead 93 is connected by lead 99 to the filament lead 74.

In the operation of this embodiment of the apparatus the plate circuit is so designed as to obtain resonance with the grid circuit including the coil 68, when the plate 19 is in a certain position which may be arbitrarily chosen. It will be apparent that as the stylus 21 follows the contour of a surface to be explored the tuning of the grid circuit will be subject to variation. Since the current flowing through the tube 60 is dependent upon the resonance between the grid circuit and the plate circuit the change in capacity of the unit 10 will be manifested in the reading of the meter 88.

The forms of the invention herein shown and described are to be considered merely as exemplary. It will be apparent that numerous modifications may be made therein without departure from the spirit of the invention or the scope of the appended claim.

What I claim is:

Apparatus for determining the contours of irregularities in a surface, said apparatus comprising a vacuum tube having an electron emitting cathode, a plate spaced from the cathode and being connected to a lead for positive plate voltage to provide an anode, a grid in the electron stream between the two, said grid and said plate being disposed in tuned electrical circuits in resonance with each other, a unit constituting an electrical condenser disposed in said grid circuit and comprising a pair of spaced electrically conductive plates, one of said plates being fixed, the other being movable to vary the spacing between them, means to support said fixed plate in predetermined space relationship to a surface to be tested, a stylus connected to the movable plate and being designed to traverse a surface to be tested, whereby variations in the surface produced variations in the spacing of the movable plate with respect to the fixed plate, a milli-ammeter in series with the plate and the lead for positive plate voltage whereby to measure plate current in the plate circuit at any displacement of the movable plate of said unit.

PHILIP W. CRIST.